US005611060A

United States Patent [19]
Belfiore et al.

[11] Patent Number: 5,611,060
[45] Date of Patent: Mar. 11, 1997

[54] AUTO-SCROLLING DURING A DRAG AND DROP OPERATION

[75] Inventors: Joseph D. Belfiore, Redmond; Christopher J. Guzak, Kirkland; Christopher E. Graham; Stephen M. Madigan, both of Redmond; Tandy W. Trower, II, Woodinviille; Randall L. Kerr, Redmond; Adrian M. Wyard, Kirkland, all of Wash.

[73] Assignee: Microsoft Corporation, Redmond, Wash.

[21] Appl. No.: 394,544

[22] Filed: Feb. 22, 1995

[51] Int. Cl.$^6$ ........................................... G06F 3/00
[52] U.S. Cl. .......................................... 395/341; 395/349
[58] Field of Search .................... 395/155–161; 345/123–125, 121, 119–120, 118, 145; 434/112

[56] References Cited

U.S. PATENT DOCUMENTS

| | | | |
|---|---|---|---|
| 4,313,113 | 1/1982 | Thornburg | 345/145 X |
| 4,663,615 | 5/1987 | Hernandez et al. | 395/157 |
| 4,714,918 | 12/1987 | Barker et al. | 395/157 |
| 4,789,962 | 12/1988 | Berry et al. | 395/156 |
| 4,794,386 | 12/1988 | Bedrij et al. | 345/119 |
| 4,831,556 | 5/1989 | Oono | 395/157 |
| 4,984,152 | 1/1991 | Muller | 395/157 X |
| 5,075,673 | 12/1991 | Yanker | 345/123 X |
| 5,155,806 | 10/1992 | Hoeber et al. | 395/157 |
| 5,157,768 | 10/1992 | Hoeber et al. | 395/157 |
| 5,169,342 | 12/1992 | Steele et al. | 434/112 |
| 5,196,838 | 3/1993 | Meier et al. | 345/118 |
| 5,299,307 | 3/1994 | Young | 395/161 |
| 5,313,229 | 5/1994 | Gilligan et al. | 345/157 |
| 5,347,295 | 9/1994 | Agulnick et al. | 395/156 |
| 5,373,309 | 12/1994 | Totsuka et al. | 345/145 |
| 5,374,942 | 12/1994 | Gilligan et al. | 345/157 |
| 5,388,197 | 2/1995 | Rayner | 395/159 X |
| 5,422,993 | 6/1995 | Fleming | 395/159 |
| 5,495,566 | 2/1996 | Kwatinetz | 395/157 |

OTHER PUBLICATIONS

Myers, "A Taxonomy of Window Manager User Interfaces", IEEE Comp. Graphics and Appl., Sep. 1988, pp. 65–84.
Simpson, Alan, *Mastering WordPerfect® 5.1 & 5.2 for Windows*™, Sybex, 1993, pp. 3, 37–39, 155–157.
Matthies, Kurt W. G., "Balloon Help Takes Off," *Power Tools, Power Programming*, 5 pages.
*Quick Results*, Microsoft® Word, Version 6.0, 1993, pp. 39–40 and 154–155.
"*Human Interface Guidlines: The Apple Desktop Interface,*" Addison–Wesley Publishing Company, Inc. 2nd printing, Feb. 1988, pp. 49–54 and 93–97.

*Primary Examiner*—Mark R. Powell
*Assistant Examiner*—John E. Breene
*Attorney, Agent, or Firm*—Seed and Berry LLP

[57] ABSTRACT

A system for scrolling during a drag and drop operation is provided wherein the determination of whether to scroll is based on the location of a mouse indicator as well as the speed of the mouse indicator. The system maintains a predetermined threshold that is empirically proven to reliably distinguish as to whether a user wishes to perform a drag and drop operation or whether the user wishes to invoke the automatic scrolling of the present invention. The system determines when the mouse indicator is over a predefined area of a window, compares the speed of the mouse indicator to the predetermined threshold and scrolls the window if the mouse indicator is over the predefined area and the speed is less than the predetermined threshold.

26 Claims, 8 Drawing Sheets

AUTO-SCROLLING DURING A DRAG AND DROP OPERATION

FIELD OF THE INVENTION

The present invention relates generally to data processing systems and, more particularly, to scrolling during a drag and drop operation in data processing systems.

BACKGROUND OF THE INVENTION

A "drag and drop" operation refers to an operation in which a user selects a screen object by using a mouse to position a mouse indicator to point at a screen object, depresses a button on the mouse ("mouse button"), uses the mouse to move the selected screen object to a destination and releases the mouse button to drop the screen object on the destination. Typically, after releasing the mouse button, the screen object appears to have moved from where it was first located to the destination. The term "screen objects" refers generally to any object displayed on a video display. Such objects include representations of files, folders, documents, databases, and spreadsheets. In addition to screen objects, the drag and drop operation can be used on selected information such as text, database records, graphic data or spreadsheet cells.

During a drag and drop operation, the destination may, in some instances, not be visible. That is, a window controls access to various screen objects. Depending on the size of the window, the size of the screen objects and the number of the screen objects under its control, the window may only be able to display a subset of the screen objects. In this case, when the destination is a screen object that is not within the subset currently being displayed, scrolling the window to reveal the destination is necessary before the user can drop the screen object at the destination. The term "scrolling" refers to changing the subset of information displayed to a user. The subset of information displayed by a window can also be referred to as the "view" of the window.

Conventional systems provide a mechanism for automatically scrolling a window during a drag and drop operation. Such a conventional system is depicted in FIG. 1. FIG. 1 depicts a video display 102 that is displaying the components of a conventional system for automatically scrolling a window during a drag and drop operation. A mouse indicator 116, a screen object 114, and a window 104 appear on the video display 102. The mouse indicator 116 reflects the movement of a mouse input device. The window 104 contains a command region 124, a display area 122, and a scroll bar 106. The command region 124 displays various pull-down menus that contain commands that can be performed on screen objects 118, 120. The display area 122 displays contents of the window, like screen objects 118, 120 or other information.

Sometimes all of the contents of a window cannot fit within the display area 122. In this case, a scroll bar 106 is presented to the user so that the user can manipulate the subset of the contents presented to the user in the display area 122. The scroll bar 106 contains a left arrow movement control 110, a grey area 132, a scroll bar thumb 134 and a right arrow movement control 108. The left arrow movement control 110 shifts the view of the display area 122 to the left one unit each time it is activated. A "unit" is a uniform amount of information to scroll and is specific to the computer program that displays the window 104. For example, if the window 104 were displayed by a word processor, the unit may be one line of text when scrolling up or down, and one tab position when scrolling left or right. Activation of the grey area 132 shifts the view of the display area 122 one window-worth of contents at a time; that is, the amount of contents that can be displayed in the display area. If the activation occurs in the grey area 132 to the left of the scroll bar thumb 134, the view shifts to the left and if the activation occurs to the right of the scroll bar thumb, the view shifts to the right. The scroll bar thumb 134 provides a logical reference point relative to the information under the control of the window 104. For example, if the display area 122 is displaying information located near the end of the information under the control of the window, the scroll bar thumb 134 will appear close to the right arrow movement control 108. The right arrow movement control 108, when activated, shifts the view of the display area 122 to the right one unit. Activation of the previously mentioned controls occurs when a user initially selects the control (or grey area) by depressing the mouse button, as well as when the user keeps the mouse button depressed after selecting the control. While the mouse button is depressed, an activation occurs after every lapse of a preset amount of time.

In utilizing the conventional system for performing automatic scrolling during a drag and drop operation, the user first selects a screen object 114 with the mouse indicator 116. The user performs this operation by positioning the mouse indicator 116 to refer to the screen object 114 and then depressing the mouse button. After depressing the mouse button, the user drags the screen object 114 across the scroll bar 106, thereby activating the scroll bar. Once the mouse indicator 116 is positioned over the scroll bar 106, the scroll bar 106 is invoked and the window automatically scrolls. If, for example, the mouse indicator is positioned over the left arrow movement control 110, the view of the display area 122 moves one unit to the left. If the mouse indicator 116 is positioned over the grey area 132, the view of the display area 122 moves one window-worth of contents. If the mouse indicator 116 is positioned over the right arrow movement control 108, the view of the display area 122 moves one unit to the right.

Thus, automatic scrolling occurs in conventional systems based solely on the location of the mouse indicator 116 during the drag and drop operation. Oftentimes, however, when a user is dragging a screen object, the user may be dragging the screen object over a number of windows before reaching the destination. Using conventional systems, when dragging over these windows, if the mouse indicator is positioned over a scroll bar, the display area of the window will scroll. This can have an undesirable effect of changing the view of the windows being utilized by a user and require that the user, after the drag and drop operation is performed, return the windows to their original views. Such unwanted scrolling can cause the user to perform their work less efficiently, as well as lead to user frustration.

SUMMARY OF THE INVENTION

In accordance with a first aspect of the present invention, a method is executed in a computer system having an input device for selecting screen objects and a computer program for displaying a window on a video display. In accordance with this method of the first aspect of the present invention, the input device selects a screen object and drags the screen object to a destination. During the dragging of the screen object to the destination, the computer program determines whether the speed of the input device is within a predefined range and whether the screen object is above a predefined area of the window. When the speed is within the predefined range and the screen object is above the predefined area, the computer program scrolls the window.

In accordance with the second aspect of the present invention, a device is provided for displaying a screen object on a video display. The device of the second aspect of the present invention comprises an input device, a calculation component, a location component, and a scrolling component. The input device is for selecting the screen object, for dragging the screen object to a destination, and for dropping the screen object at the destination. The calculation component is for calculating a speed of the input device while the input device is dragging the screen object to the destination. The location component is for determining whether the screen object is located over a predefined area of the window while the input device is dragging the screen object to the destination. The scrolling component is for scrolling the information in the window when the calculated speed is within a predefined range and when the screen object is located over the predefined area of the window.

DETAILED DESCRIPTION OF THE INVENTION

A preferred embodiment of the present invention provides an automatic scroll mechanism ("autoscroll") that performs automatic scrolling during a drag and drop operation when the speed of the mouse indicator is below a predetermined threshold and the mouse indicator is within a predefined area of a window. Therefore, the preferred embodiment of the present invention determines whether to automatically scroll a window based upon the location of the mouse indicator, as well as the speed (or velocity) of the mouse indicator. The predetermined threshold is empirically proven so as to be able to distinguish between when a user wishes to drag over a window and when a user wishes to invoke autoscroll, thereby preventing unwanted scrolling. By using the speed of the mouse indicator in addition to the location of the mouse indicator to prevent unwanted scrolling, the present invention can increase the productivity of users and reduce user frustration.

The description of the embodiment described herein ("the embodiment") is presented in two parts. First, a high level overview is given that provides a functional overview of the embodiment as well as the user visible components. The second part of the description describes the implementation-related details of the embodiment.

Figure 1:
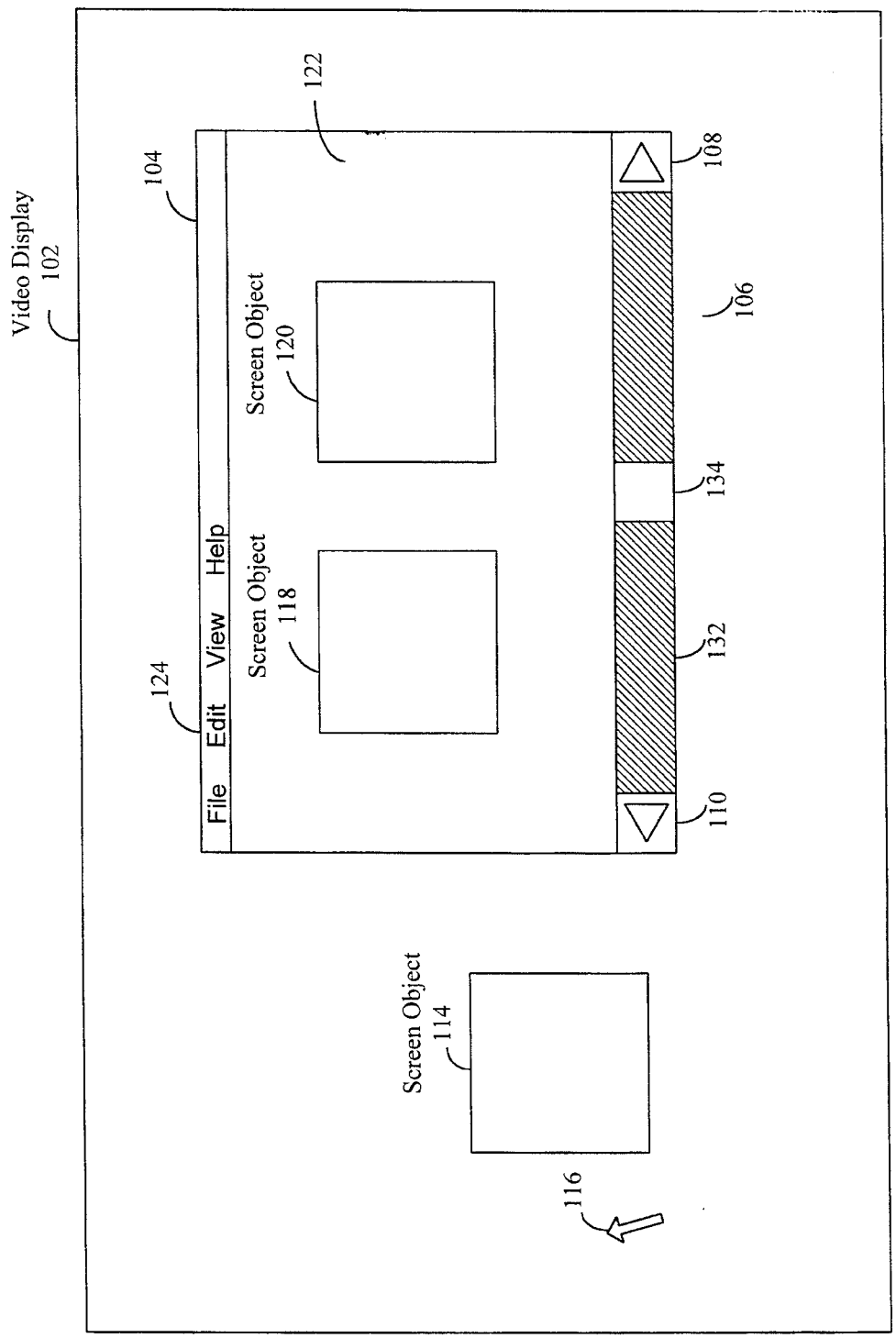
FIG. 1 depicts a video display displaying the components of a conventional system for automatically scrolling a window during a drag and drop operation.
Figure 2:
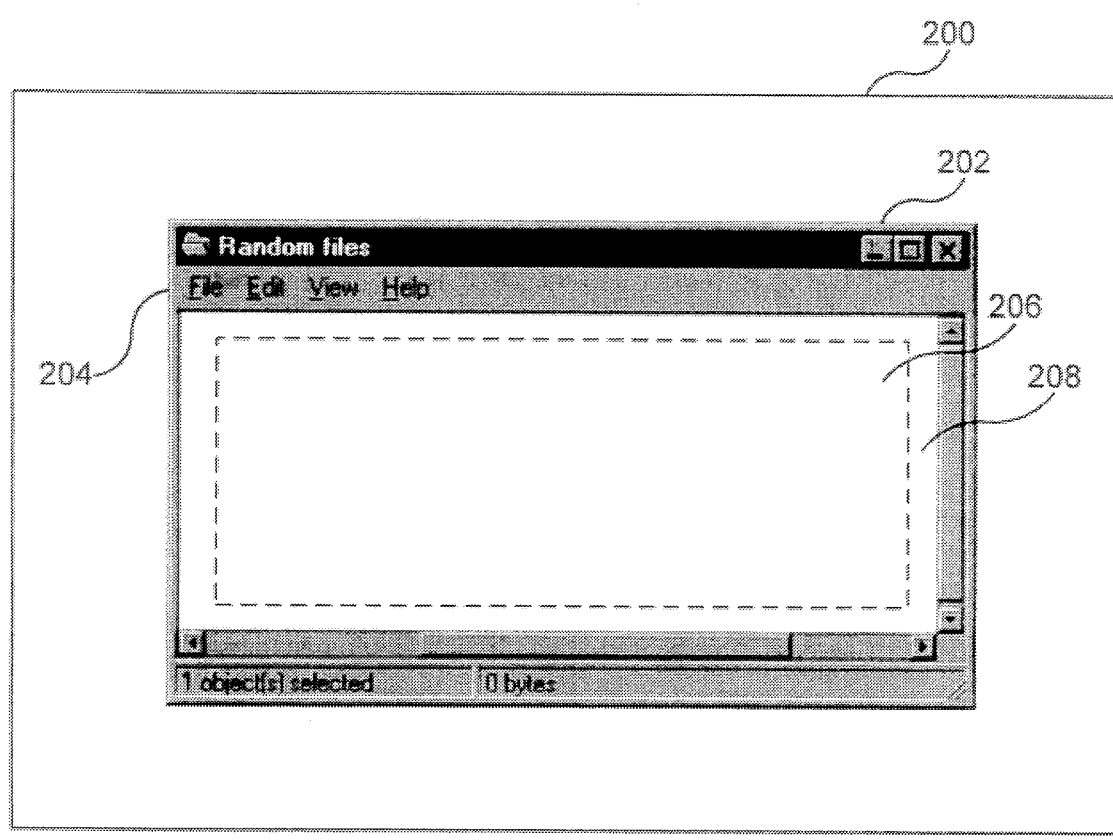
FIG. 2 depicts a video display displaying a window that utilizes a preferred embodiment of the present invention.

FIG. 2 depicts a video display 200 displaying a window 202 that utilizes a preferred embodiment of the present invention. The window 202 contains a command region 204, a display area 206, and a scroll region 208. The scroll region 208, although depicted, is actually invisible to the user. The scroll region 208 forms an invisible boundary within the edge of the display area 206 of the window that is one-half of the size of the cursor in depth. That is, the distance from the edge of the display area 206 to the inner part of the scroll region 208 is one-half of the size of the cursor as the cursor appears lengthwise. The scroll region 208 is used by the embodiment to trigger automatic scrolling when the mouse indicator is within the scroll region and the speed of the mouse, relative to the video display, is below a predetermined threshold. Alternatively, instead of using a scroll region, the present invention can utilize the edge of the display area 208 to trigger automatic scrolling. That is, automatic scrolling can be triggered when the mouse indicator is at the edge of the display area 208 and the speed of the mouse is below a predetermined threshold. One skilled in the art will appreciate that the present invention can utilize the edge of the display area 208 to trigger automatic scrolling by defining the edge of the display area to be the scroll region. In this case, automatic scrolling will be triggered when the mouse indicator touches the edge of the display area. The display area 206 of the window of the present invention can be used to display contents that include screen objects, and other types of information. The information displayed by the window of the preferred embodiment of the present invention includes: file icons, bitmap objects, draw objects, controls, embedded objects, text, video images, graphic data, database records or spreadsheet cells. A "file icon" is an icon representing a file on the display. A "bitmap object" is a screen oriented object containing a bitmapped image, such as an object displayed by a paint program. A "draw object" is an object created by a drawing program, such as the "Microsoft Draw" program sold by Microsoft Corporation of Redmond, Wash. A "control" is a screen oriented object, such as an edit box or push button, that displays information to a user and accepts user input. Controls can be displayed as part of a forms design program, such as "Visual Basic" sold by Microsoft Corporation of Redmond, Wash. or a computer program that displays windows as part of its processing ("a window display program"). An "embedded object" is an object that is stored in a compound document, such as a spreadsheet stored in a word processing document. A compound document is a container that stores objects that are of different types.

Although the scroll region has been described relative to a specific size, one skilled in the art will appreciate that the scroll region can be of a different size and, as previously described, can be defined to be the edge of the display area. Although the scroll region has been depicted as being rectangular, one skilled in the art will appreciate that the scroll region can be implemented as other shapes including, but not limited to, circular, oval, square, octagonal or irregular.

Figure 3:
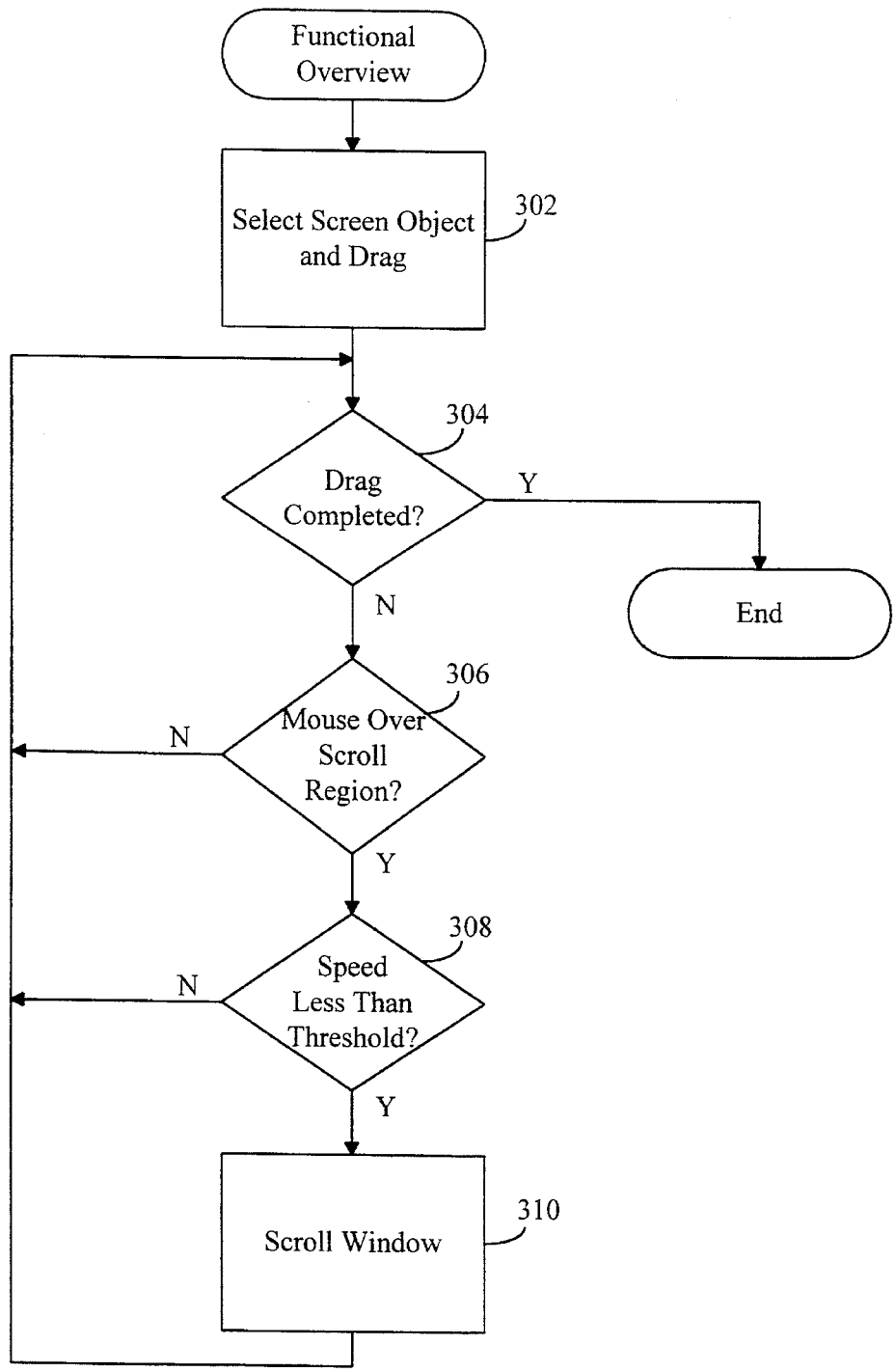
FIG. 3 depicts a flowchart depicting a functional overview of the preferred embodiment of the present invention.

FIG. 3 depicts a flow chart of a functional overview of the embodiment. The first step performed in utilizing the embodiment is that a user selects a screen object and drags the screen object across the video display (step 302). The embodiment then determines if the drag operation has completed (step 304). If the user cancels the drag operation or drops the screen object, processing ends. However, while the user is performing the drag operation, the embodiment determines whether the mouse indicator is positioned over the scroll region (step 306). If the mouse indicator is not positioned over the scroll region, the embodiment continues to step 304. If the mouse indicator is positioned over the scroll region, the embodiment determines whether the speed of the mouse is less than the predetermined threshold (step 308). The calculation of the speed of the mouse indicator will be described in more detail below. If the speed of the mouse indicator is less than the predetermined threshold, the embodiment scrolls the window (step 310). However, if the speed is not less than the predetermined threshold, the embodiment proceeds to step 304 and determines whether the drag operation is still occurring.

Although the present invention is described as determining when to scroll a window, one skilled in the art will appreciate that the present invention can be used to perform other window-related functions. Such window-related functions may include zooming-in on the contents of the window, zooming-out on the contents of the window, or changing a color associated with the window. Zooming-in and zooming-out refers to enlarging the view of the contents and to shrinking the view of the contents, respectively.

Figure 4A:
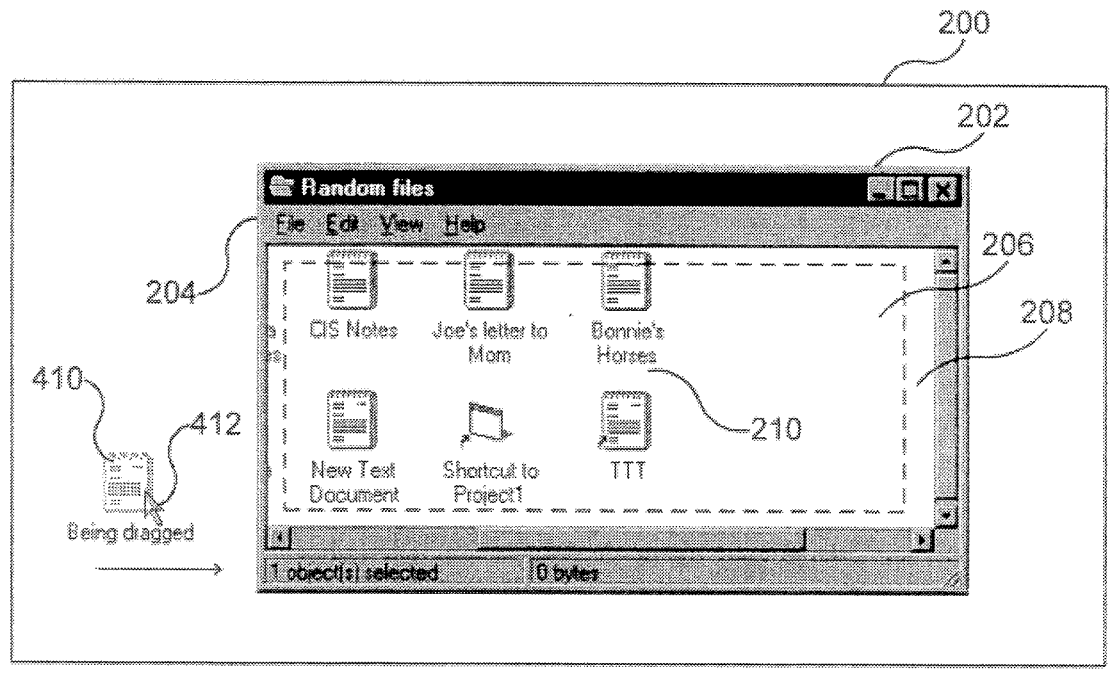
FIGS. 4A, 4B, and 4C depict an example of the operation of the preferred embodiment of the present invention.
Figure 4B:
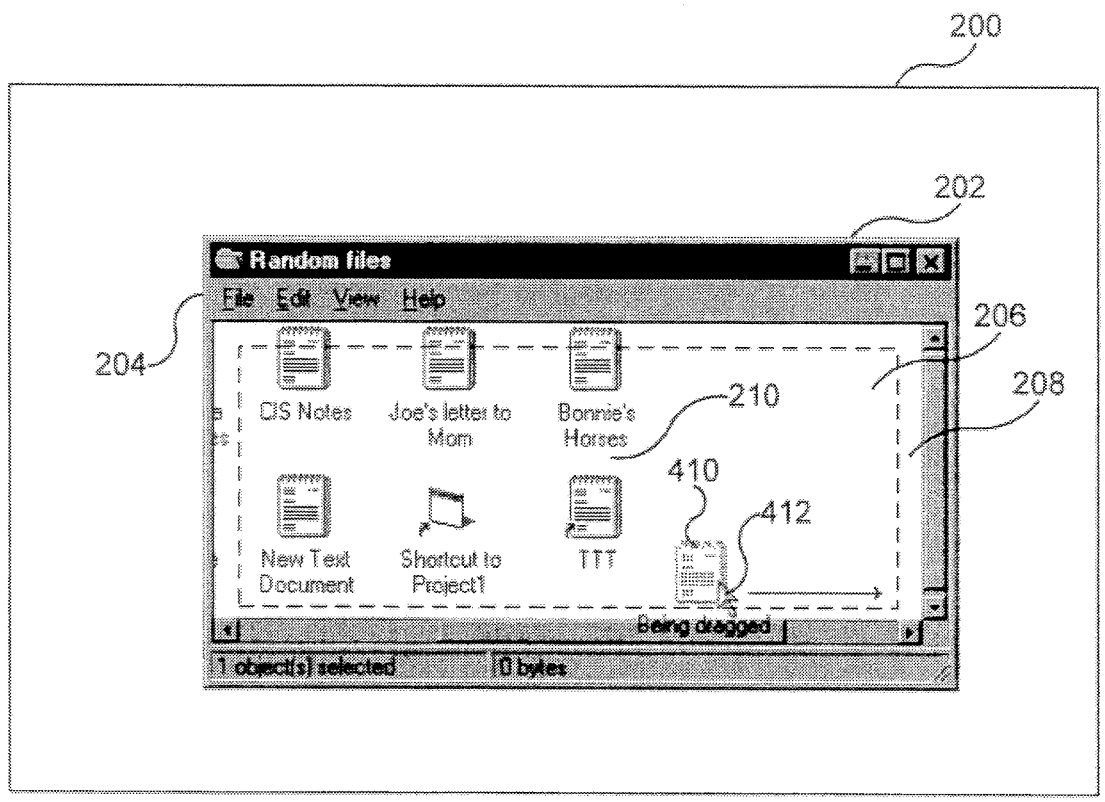
Figure 4C:
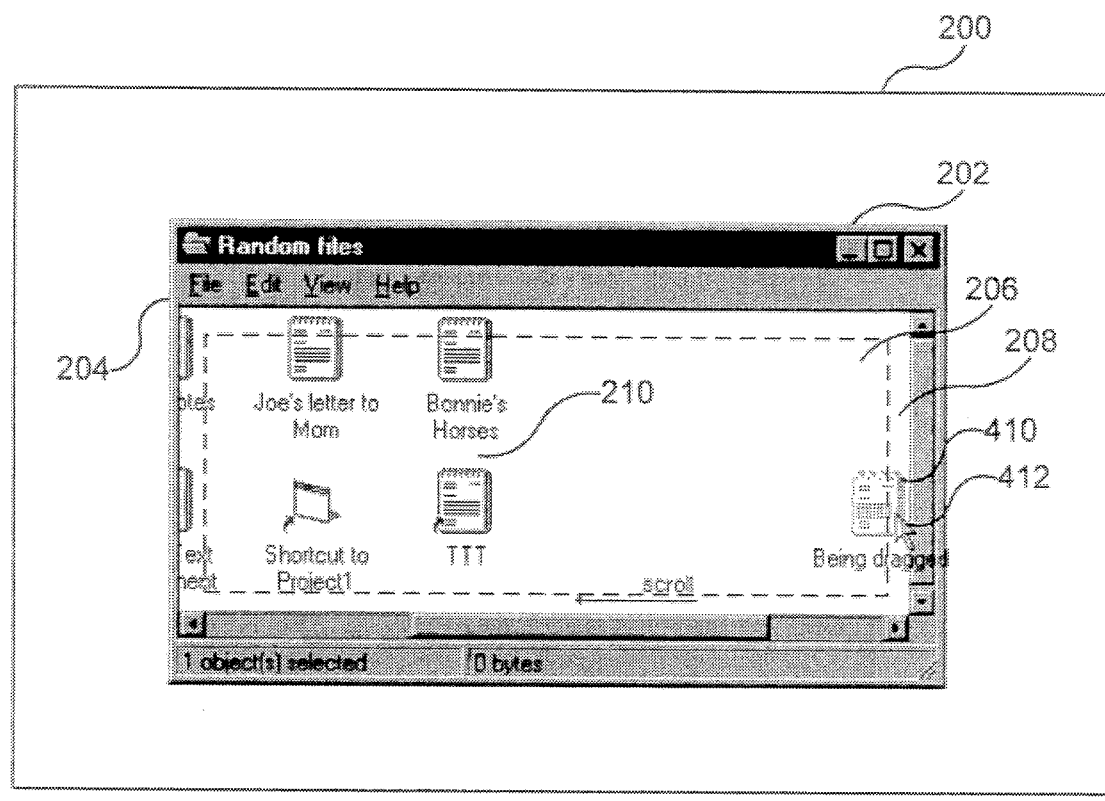

An example of operation of the preferred embodiment of the present invention is depicted in FIGS. 4A, 4B, and 4C. In FIG. 4A, the user has selected a screen object 410 by positioning the mouse indicator 412 over the screen object and depressing the mouse button 511. In FIG. 4B, the user is dragging the selected screen object 410 over the display area 206 of the window 202 to a destination that is out of view in the direction of the right arrow movement control. In FIG. 4C, the user has slowed the speed with which the user is dragging the selected screen object 410 to below the predetermined threshold and the mouse indicator 412 is within the scroll region 208. When the speed is below the predetermined threshold and the mouse indicator 412 is within the scroll region 208, the embodiment scrolls the contents 210 of the window 202. In this example, the contents 210 are scrolled to the left. The scrolling of the contents 210 proceeds in a direction starting from the location of the mouse indicator 412 within the scroll region 208 and progressing toward the opposite side of the scroll region. That is, if the mouse indicator 412 were on the upper portion of the scroll region 208, the contents 210 would be scrolled in a direction toward the lower portion of the scroll region. Further, if the mouse indicator 412 is in the left portion of the scroll region 208 or the lower portion of the scroll region, the scrolling occurs in a rightward or upward direction, respectively. The notion of "portions" will be discussed in more detail below.

Figure 5:
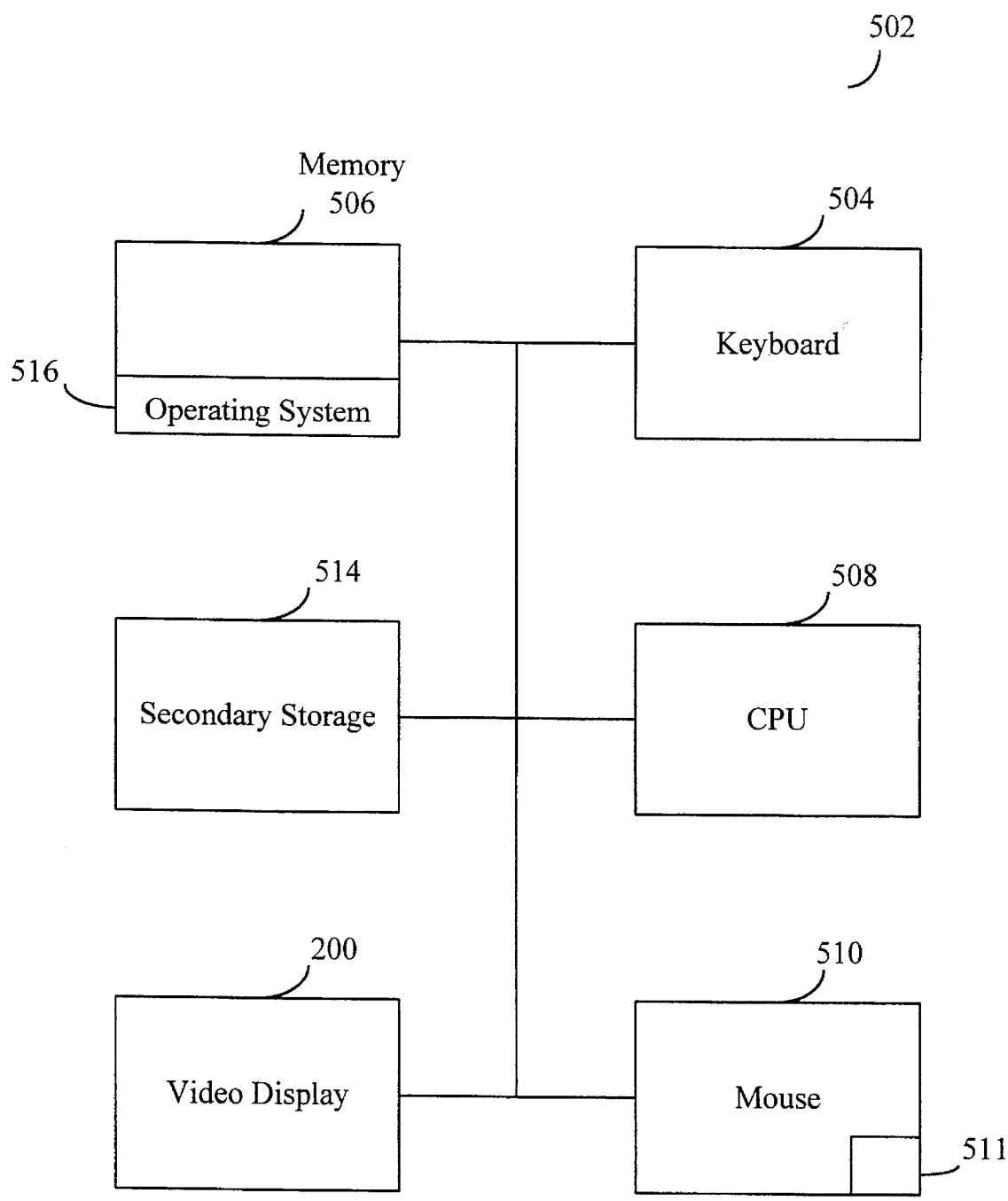
FIG. 5 is a block diagram of a data processing system that is suitable for practicing the preferred embodiment of the present invention.

FIG. 5 is a block diagram of a data processing system 502 that is suitable for practicing the preferred embodiment of the present invention. The data processing system 502 includes at least one central processing unit (CPU)508. The CPU 508 is connected to a number of peripheral devices, including a mouse 510, a keyboard 504, and the video display 200. The mouse 510 has a mouse button 511. The CPU 508 is also connected to a memory 506 and a secondary storage device 514, such as a hard disk drive. The memory 508 holds a copy of an operating system 416, such as the "MICROSOFT WINDOWS" operating system sold by Microsoft Corporation of Redmond, Wash. The implementation of the preferred embodiment of the present invention will be described below with reference to use of automatic scrolling within the operating system 516. Nevertheless, it should be appreciated that the automatic scrolling may alternatively be implemented in an application program.

The operating system receives events from the keyboard and the mouse. Such events include keystrokes, mouse indicator movements or depressions/releases of the mouse button. For example, when the mouse button is depressed, a "MOUSE_DOWN" event is generated by the mouse driver and is sent to the operating system. The operating system has a system procedure that handles events received from peripheral devices as well as events that are generated by the operating system. One such event generated by the operating system is a timer event where the operating system sets a timer and receives an event upon the expiration of the timer. The system procedure, in turn, has a number of functions that the system procedure invokes depending on the specific event that has occurred. For example, the system procedure for the "MICROSOFT WINDOWS" operating system invokes an "autoscroll" function ("the function") when receiving a MOUSE_DOWN event.

Figure 6A:
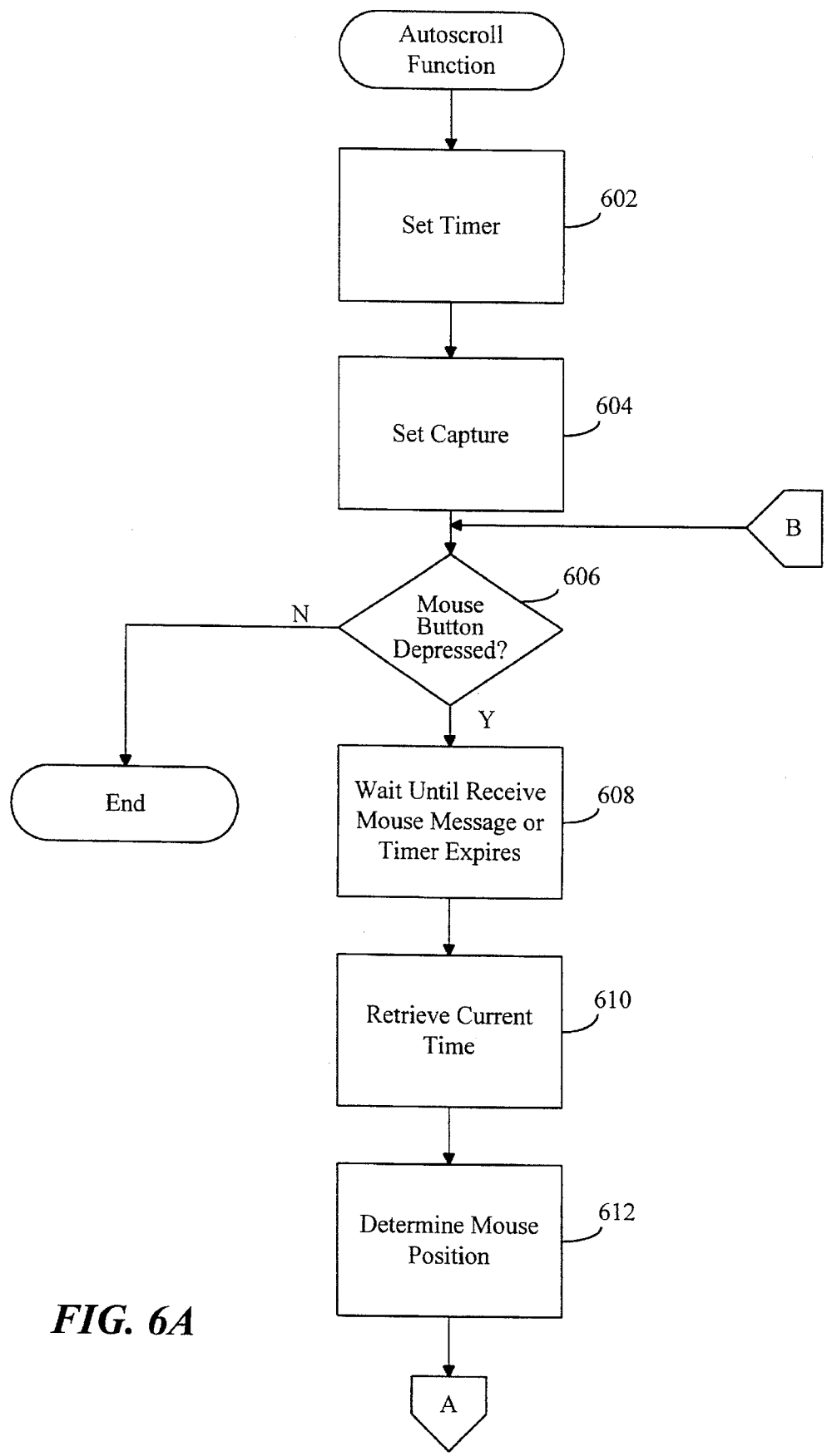
FIGS. 6A and 6B depict a flowchart of the steps performed by the function utilized by the preferred embodiment of the present invention.
Figure 6B:
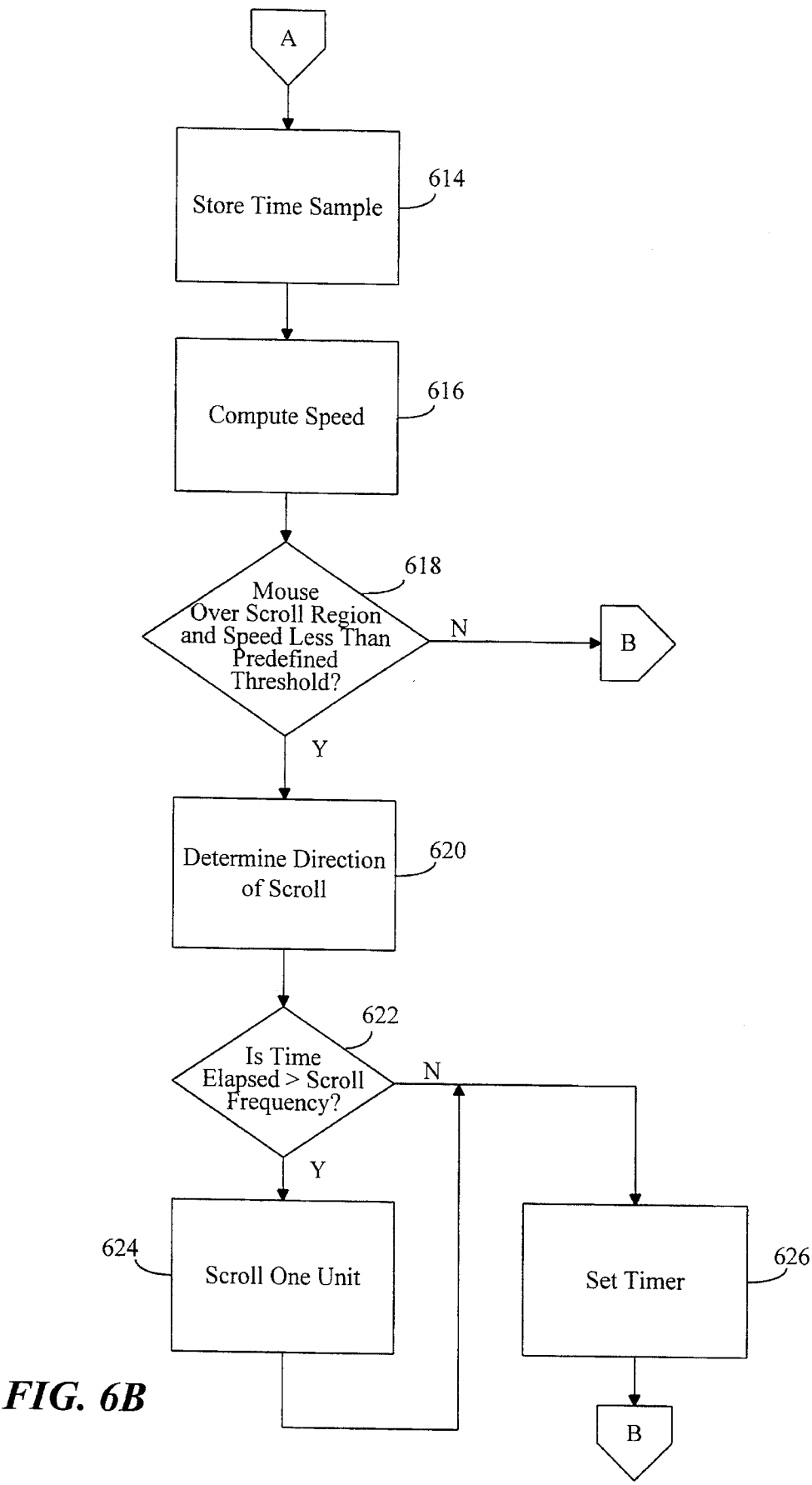

FIGS. 6A and 6B depict a flow chart of the steps performed by a function utilized in the preferred embodiment of the present invention. The function performs automatic scrolling of a window when the mouse indicator is positioned over the scroll region and the speed of the mouse, relative to the video display, is less than the predetermined threshold. The first step that the function performs is to set a timer to 100 milliseconds so that the function can be awakened periodically to perform processing (step 602). Setting the timer is performed by invoking an operating system utility. The function then sets capture (step 604). In this step, "setting capture" refers to the function indicating that it wants to be notified upon every mouse move message received by the operating system. The function then determines whether the mouse button is still depressed (step 606). If the mouse button, during the processing of the function, were released, the processing of the function ends. If, however, the mouse button remains depressed, the function waits until either receiving a mouse message or until the timer expires (step 608). After receiving a mouse move message or upon the timer expiring, the function retrieves the current time (step 610). Retrieving the current time is performed as an operating system utility. The current time is retrieved as a 32-bit value indicating the length of time since start up of the data processing system. The value is a multiple of the minimum granularity of the system clock (i.e., clock ticks). The function then ascertains the mouse position (step 612). In this step, the function determines the mouse coordinates. The "mouse coordinates" refers to the Cartesian coordinates of the mouse indicator relative to the upper left corner of the video display. After determining the mouse position, the function stores a time sample (step 614 in FIG. 6B). The "time sample" refers to a pair of values with one value being the current time and the other value being the mouse position at that time. The function stores the time sample into a circular array so as to create a history of time samples. The circular array is maintained in the memory 506 of the data processing system 502. The number of time samples stored by the function is three. Thus, when a new time sample is stored, the oldest time sample is overwritten.

After storing the time sample, the function computes the speed of the mouse indicator (step 616). This step is performed by accessing the time samples as stored in the circular array, summing the distance between the mouse coordinates in each time sample, and dividing the distance by the sum of the times elapsed between the samples. After computing the speed, the function determines whether the mouse indicator is over the scroll region and the speed is less than the predetermined threshold (step 618). The function determines if the mouse indicator is over the scroll region by examining the last stored time sample. The predetermined threshold is an empirically proven speed that reliably distinguishes between when a user is dragging a screen object or when a user is attempting to invoke the automatic scrolling mechanism of the present invention. In the embodiment described herein, since the time is expressed as clock ticks, the predefined threshold is a unitless number. The predefined threshold utilized in the embodiment is 20. If the speed is not less than the predefined threshold, the function continues to step 606 to determine whether the mouse button is still depressed. If the speed is less than the predefined threshold, the function determines in which direction the scroll is to be performed (step 620). That is, the direction of the scroll is performed in a direction starting from where the mouse indicator is currently located and progressing toward the oppositely facing portion of the scroll region. In this respect, the scroll region is divided into four portions: a right portion, a lower portion, a left portion, and an upper portion. Each portion corresponds to a side of the rectangular scroll region. Therefore, in this step, the function determines whether the mouse indicator is in the right, the lower, the left, or the upper portion of the scroll region and scrolls from the portion in which the mouse indicator is located toward the oppositely facing portion. One skilled in the art will appreciate that the scroll region can have many different portions and that the scrolling can be performed in additional directions. In determining the direction of the scroll, the function uses the most recently obtained mouse coordinates.

After determining the direction of the scroll, the function determines whether the time elapsed is greater than the scroll frequency (step 622). In this step, the function maintains an indicator of the last time that scrolling occurred (the "indicator") and uses the indicator to compute the time elapsed. The time elapsed is a value obtained by subtracting the indicator from the current time. The time elapsed is then checked against the scroll frequency to determine whether scrolling should occur. The scroll frequency is a predefined value that indicates how many lines per second are scrolled. The embodiment scrolls four lines per second. Therefore, if the time elapsed is determined to be less than 0.25 second, the time elapsed is not greater than the scroll frequency. However, for example, if the time elapsed were 0.3 second, the time elapsed would be greater than the scroll frequency. If the time elapsed is greater than the scroll frequency, the function scrolls one unit (step 624). If, however, the time elapsed is not greater than the scroll frequency, the function sets the timer to 100 milliseconds (step 626). After setting the timer, the function continues to step 606 to determine whether the mouse button is still depressed. Although the present invention has been described as scrolling one line at a time, one skilled in the art will appreciate that the present invention can scroll other units of granularity including a window-worth of information.

While the present invention has been described with reference to a preferred embodiment thereof, those skilled in the art will appreciate that various changes in form and detail may be made without departing from the intended scope of the present invention as defined in the appended claims.

We claim:

1. In a computer system having an input device with an input device indicator for performing a drag and drop operation, a video display and a computer program for displaying a window on the video display, the input device indicator reflecting movement of the input device on the video display, wherein the input device performs the drag and drop operation by selecting a screen object on the video display, dragging the selected screen object across the video display to a destination, and dropping the selected screen object at the destination, the input device indicator having a speed associated with dragging the selected screen object, the window having contents and a scroll region, the scroll region for determining when to scroll the contents of the window, a method for displaying the contents of the window comprising the steps of:

under the control of the computer program,
determining a location of the input device indicator on the video display when the input device is performing a drag and drop operation;
determining the speed of the input device indicator when the location of the input device indicator is within the scroll region; and
scrolling the contents of the window in response to the input device indicator being within the scroll region and the speed being below a predefined value.

2. The method of claim 1 wherein the computer program is an operating system and wherein the contents of the window are screen objects.

3. The method of claim 1 wherein the computer program is a word processor and wherein the contents of the window is text.

4. The method of claim 1 wherein the computer program is a database and wherein the contents of the window are database records.

5. The method of claim 1 wherein the computer program is a spreadsheet program and wherein the contents of the window are spreadsheet cells.

6. The method of claim 1 wherein the computer program is a paint program and wherein the contents of the window are bitmap objects.

7. The method of claim 1 wherein the computer program is a drawing program and wherein the contents of the window are draw objects.

8. The method of claim 1 wherein the computer program is a forms design program and wherein the contents of the window are controls.

9. The method of claim 1 wherein the computer program is a compound document and wherein the contents of the window are embedded objects.

10. The method of claim 1 wherein the computer program is a window display program and wherein the contents of the window are controls.

11. In a computer system having an input device with an input device indicator for selecting screen objects on a video display and for dragging the selected screen objects across the video display to a destination, and a computer program for displaying a window on the video display, the input device indicator for reflecting movement of the input device on the video display and having a speed associated with dragging the selected screen objects, the window having contents and a scroll region, the scroll region for determining when to scroll the contents of the window, a method for displaying the contents of the window comprising the steps of:

selecting a screen object using the input device;
initiating a drag of the screen object to a destination in response to a user using the input device; and
when the screen object is positioned in the scroll region during the drag,
determining with the computer program whether the speed of the input device indicator is within a predefined range;
scrolling the window by the computer program in response to the computer program making a determination that the speed is within the predefined range and the screen object being positioned in the scroll region; and when the screen object is positioned at the destination during the drag,
  dropping the screen object at the destination in response to the user using the input device.

12. The method of claim 11 wherein the input device is a mouse.

13. The method of claim 11 wherein the scroll region has a plurality of portions, wherein the input device indicator points to a portion when scrolling the window, wherein the portion has an oppositely facing portion, and wherein the step of scrolling the window further includes the steps of:
  determining a portion pointed to by the input device indicator by the computer program; and
  scrolling the window in a direction from the portion referred to by the input device indicator toward the oppositely facing portion.

14. The method of claim 11 wherein the video display displays a second window, wherein the second window displays contents, wherein the step of selecting the screen object includes the step of selecting the contents of the second window, wherein the step of initiating the drag of the screen object includes the step of initiating a drag of the selected contents of the second window to the destination, and wherein the step of dropping the screen object includes the step of dropping the selected contents at the destination.

15. In a computer system having an input device, a video display, an input device indicator for reflecting movement of the input device on the video display, and a computer program for displaying a window on the video display and a screen object on the video display, the window for displaying contents according to a view, the window having a plurality of views of the contents and a predefined area, the predefined area for determining whether to change the view, a method for displaying contents of a window comprising the steps of:
  displaying a first view of the contents of the window;
  selecting the screen object in response to a user using the input device;
  positioning the screen object over the predefined area of the window in response to the user using the input device to select the screen object;
  calculating a speed of the input device indicator in response to positioning the screen object over the predefined area of the window; and
  displaying a second view of the contents of the window by the computer program in response to the speed being calculated to be within a predefined range and the screen object being positioned over the predefined area of the window.

16. The method of claim 15 wherein the step of displaying the second view includes the step of scrolling the contents of the window.

17. The method of claim 16 wherein the predefined area has a plurality of portions, wherein the step of positioning the screen object includes the step of positioning the screen object over a portion and wherein the step of scrolling includes the step of scrolling the contents of the window in a direction from the portion over which the screen object is positioned toward an oppositely facing portion.

18. The method of claim 15 wherein the step of displaying the second view includes the step of displaying a second view that exposes more of the contents of the window.

19. The method of claim 15 wherein the step of displaying the second view includes the step of displaying a second view that exposes less of the contents of the window.

20. The method of claim 15 wherein the window has a plurality of colors, wherein the step of displaying the second view includes the step of changing a color of the window.

21. In a computer system having a mouse input device with a mouse indicator and a computer program for displaying a window on a video display, for displaying a screen object on the video display, and for performing a drag and drop operation wherein the screen object is selected by the mouse input device, dragged to a destination on the video display and dropped at the destination, the mouse indicator for reflecting movement of the mouse input device on the video display, the window for displaying contents according to a view, the window having a plurality of views of the contents and having a predefined area, the predefined area for determining whether to change the view, a method for displaying contents of a window comprising the steps of:
  displaying a first view of the contents of the window;
  initiating a drag and drop operation in response to a user using the mouse input device; and
  during the drag and drop operation,
    calculating a speed of the mouse indicator;
    determining whether the mouse indicator is positioned over the predefined area of the window after calculating the speed of the mouse indicator; and
    displaying a second view of the contents of the window by the computer program in response to the mouse indicator being positioned over the predefined area of the window and the calculated speed being within a predefined range.

22. A device for displaying a screen object on a video display, for displaying a window on the video display and for dragging and dropping the screen object on the video display, wherein the window displays contents, the device comprising:
  an input device for use by a user in selecting the screen object, for dragging the screen object to a destination, and for dropping the screen object at the destination;
  a calculation component for calculating a speed of the input device relative to the video display while the input device is dragging the screen object to the destination;
  a location component for determining whether the screen object is located over a predefined area of the window while the input device is dragging the screen object to the destination; and
  a scrolling component for scrolling the contents in the window in response to the speed of the input device being calculated by the calculation component to be within a predefined range and in response the screen object being located over the predefined area of the window.

23. A computer-readable medium whose contents cause a computer system to display contents of a window, the computer system having an input device with an input device indicator for performing a drag and drop operation, a video display and a computer program for displaying the window on the video display, the input device indicator reflecting movement of the input device on the video display, wherein the input device performs the drag and drop operation by selecting a screen object on the video display, dragging the selected screen object across the video display to a destination, and dropping the selected screen object at the destination, the input device indicator having a speed associated with dragging the selected screen object, the window having the contents and a scroll region, the scroll region for determining when to scroll the contents of the window, by performing the steps of:
  under the control of the computer program,
    determining a location of the input device indicator on the video display when the input device is performing a drag and drop operation;

determining the speed of the input device indicator when the location of the input device indicator is within the scroll region; and scrolling the contents of the window in response to the input device indicator being within the scroll region and the speed being below a predefined value.

24. A computer-readable medium whose contents cause a computer system to display contents of a window, the computer system having an input device with an input device indicator for selecting screen objects on a video display and for dragging the selected screen objects across the video display to a destination, and a computer program for displaying the window on the video display, the input device indicator for reflecting movement of the input device on the video display and having a speed associated with dragging the selected screen objects, the window having the contents and a scroll region, the scroll region for determining when to scroll the contents of the window, by performing the steps of:

selecting a screen object using the input device;

initiating a drag of the screen object to a destination in response to a user using the input device; and when the screen object is positioned in the scroll region during the drag,
  determining with the computer program whether the speed of the input device indicator is within a predefined range;
  scrolling the window by the computer program in response to the computer program making a determination that the speed is within the predefined range and the screen object being positioned in the scroll region; and when the screen object is positioned at the destination during the drag,
  dropping the screen object at the destination in response to the user using the input device.

25. A computer-readable medium whose contents cause a computer system to display contents of a window, the computer system having an input device, a video display, an input device indicator for reflecting movement of the input device on the video display, and a computer program for displaying the window on the video display and a screen object on the video display, the window for displaying the contents according to a view, the window having a plurality of views of the contents and a predefined area, the predefined area for determining whether to change the view, by performing the steps of:

displaying a first view of the contents of the window;

selecting the screen object in response to a user using the input device;

positioning the screen object over the predefined area of the window in response to the user using the input device to select the screen object;

calculating a speed of the input device indicator in response to positioning the screen object over the predefined area of the window; and displaying a second view of the contents of the window by the computer program in response to the speed being calculated to be within a predefined range and the screen object being positioned over the predefined area of the window.

26. A computer-readable medium whose contents cause a computer system to display contents of a window, the computer system having a mouse input device with a mouse indicator and a computer program for displaying the window on a video display, for displaying a screen object on the video display, and for performing a drag and drop operation wherein the screen object is selected by the mouse input device, dragged to a destination on the video display and dropped at the destination, the mouse indicator for reflecting movement of the mouse input device on the video display, the window for displaying the contents according to a view, the window having a plurality of views of the contents and having a predefined area, the predefined area for determining whether to change the view, by performing the steps of:

displaying a first view of the contents of the window;

initiating a drag and drop operation in response to a user using the mouse input device; and during the drag and drop operation,
  calculating a speed of the mouse indicator;
  determining whether the mouse indicator is positioned over the predefined area of the window after calculating the speed of the mouse indicator; and
  displaying a second view of the contents of the window by the computer program in response to the mouse indicator being positioned over the predefined area of the window and the calculated speed being within a predefined range.

* * * * *